United States Patent
Shillam

[15] 3,646,839
[45] Mar. 7, 1972

[54] MACHINE TOOL CONTROL SYSTEMS
[72] Inventor: Norman Frederick Shillam, Farnborough, England
[73] Assignee: National Research Development Corporation, London, England
[22] Filed: May 7, 1970
[21] Appl. No.: 35,520

[30] Foreign Application Priority Data

May 12, 1969 Great Britain......................23,998/69

[52] U.S. Cl..............................82/1, 82/DIG. 1, 318/571, 318/634
[51] Int. Cl......................................................B23b 25/06
[58] Field of Search............................82/1, DIG. 1, 24, 2 B; 318/571, 634

[56] References Cited

UNITED STATES PATENTS

| | | | |
|---|---|---|---|
| 2,161,570 | 6/1939 | Harris | 82/DIG. 1 |
| 2,314,753 | 3/1943 | Asimow | 82/DIG. 1 |
| 2,672,067 | 3/1954 | Hansell | 82/24 |

*Primary Examiner*—Leonidas Vlachos
*Attorney*—Cushman, Darby & Cushman

[57] ABSTRACT

A control system for a metal cutting machine tool in which a thermally generated e.m.f. developed between a cutting edge and a workpiece is used to control the cutting speed within desired limits. The system comprises a servo having a speed control loop which responds to the thermal e.m.f. and is arranged to adjust the cutting speed continuously so as to bring the thermal e.m.f. to within predetermined limits.

6 Claims, 1 Drawing Figure

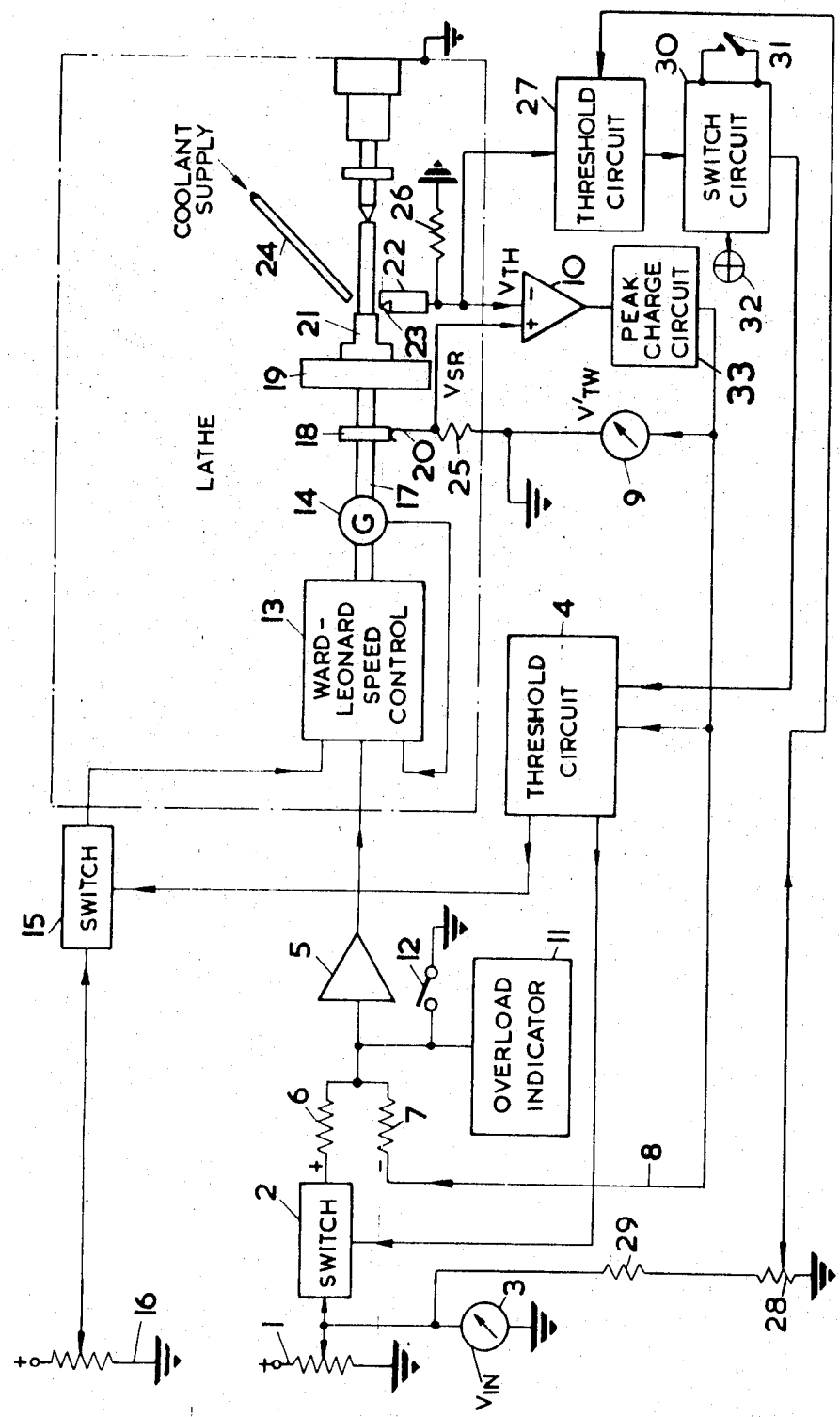

MACHINE TOOL CONTROL SYSTEMS

The present invention relates to metal cutting tools and processes.

One of the main factors controlling the economics of metal cutting processes using machine tools is the relationship between metal removal rate and the useful life of the cutting edge used. An optimum metal removal rate may be chosen from an empirical determination of this relationship. The temperature developed at the cutting edge is a parameter closely connected with the metal removal rate and with the useful life of the cutting edge; it is known that this temperature causes a thermal e.m.f. to develop across the interface between the cutting edge and the metal which is being cut. This e.m.f. has been measured in laboratory conditions with special precautions to eliminate, or at lest very considerably reduce, all extraneous electrical noises of the kinds usually encountered in industrial metal-cutting workshops, some of the precautions taken being impractical in industrial conditions.

One of the problems associated with the measurement of the thermal e.m.f. is that of swarf buildup around the cutting tool and workpiece. When long sections of swarf accumulate they tend to produce attenuations in the thermal e.m.f. because they simultaneously touch both workpiece and parts of the machine frame. The tool holder may be provided with an insulating ceramic coating so that the pieces of swarf which touch the tool holder and the machine frame do not cause any appreciable attenuation of the thermal e.m.f. Any swarf connected to the workpiece which touches the machine frame attenuates the thermal e.m.f. without completely cancelling it, since the resistance in the intended circuit is in practice comparable with, or not much greater than, the resistance of the unwanted contact between the swarf and the machine frame. The source impedance of the thermal e.m.f. is very low and typically may be a few milliohms.

It is an object of the present invention to provide a relatively simple control system for a machine tool which can operate in a workshop environment. It is a further object of this invention to provide a control system which may be used to maintain the metal removal rate close to the maximum rate which is consistent with an acceptable cutting-edge life.

It is another object of the present invention to provide means for detecting swarf accumulation quickly, and for making effective measurements of the thermal e.m.f. in spite of the short-circuiting effects of the swarf produced in metal-cutting operations.

According to the present invention in one aspect thereof, a metal-cutting machine tool is provided with a control system comprising a thermal e.m.f. detector circuit for detecting and amplifying thermoelectric voltages developed between a metallic workpiece and a cutting edge on the machine tool, and cutting speed control means responsive to the output of the detector circuit, for providing a continuous adjustment of the cutting speed, and adjusting the cutting speed so as to tend to bring the thermoelectric voltage to a preset value; wherein the thermal e.m.f. detector includes a first resistance and a second resistance connected in series and arranged so that any electrical connection made between the workpiece and the frame of the machine tool will tend to shunt the first resistance and produce a relatively large voltage excursion across the second resistance, and also including comparator means for comparing the voltage across the second resistance with a predetermined reference voltage.

The detector may include an amplifier having a differential input stage wherein one input is supplied with a voltage signal developed across the first resistance and the other input is supplied with a voltage signal developed across the second resistance.

Switch circuits responsive to the comparator means may be provided to operate a warning device, and to reduce the cutting speed to a predetermined value whenever the said voltage excursion exceeds the reference voltage.

The cutting speed control means is preferably of a type which does not use pulsed or digital signals. It may include a speed control system of the Ward-Leonard type, or one of the known modifications thereof. The whole arrangement will constitute a servosystem. It may include a transducer for providing a signal indicative of the operating speed of the machine tool, an inner feedback loop responsive to the operating speed signal and arranged to tend to maintain the cutting speed at a set value, and an outer feedback loop responsive to the thermoelectric voltage and arranged to adjust the set value of operating speed which the inner feedback loop tends to maintain, so as to tend to bring the thermoelectric voltage to a predetermined value. A threshold circuit, and switch circuits operated by the threshold circuit, may be provided in the outer feedback loop, to substantially disconnect the outer feedback loop and to fix the set value of cutting speed at a predetermined maximum value on occasions when the thermoelectric voltage is absent or less than a predetermined threshold voltage.

According to the present invention in another aspect thereof, in a metal-cutting process the cutting speed is controlled by a servosystem including an inner feedback loop arranged to maintain the cutting speed at a set value, and an outer feedback loop responsive to a thermoelectric voltage developed between the metal being cut and the cutting tool used to cut it for adjusting the aforesaid set value of the cutting speed, so as to tend to adjust the thermoelectric voltage to a predetermined value. A threshold circuit and switch circuits operated by the threshold circuit are arranged to reduce the cutting speed when the thermoelectric voltage is absent or less than a predetermined threshold voltage.

A thermoelectric voltage is generated at the interface between cutting tool and workpiece and is a function of the average temperature along the edge of the cutting tool. This thermoelectric voltage has the advantage that it can be easily measured by apparatus not requiring encumbrances inconveniently situated near the cutting edge of the tool, or in close thermal contact with it. A relationship exists between the rate of wear and the operating temperature of a cutting tool. It is known that, above a particular temperature, accelerated wear takes place. This temperature will vary according to the composition of the cutting tool and the material of the workpiece. An optimum temperature, or related optimum value of the thermoelectric voltage, may be chosen from experimental investigations.

The effects of swarf accumulation around a cutting tool - workpiece interface on a control system responsive to the thermal e.m.f. would normally, cause surging of the cutting speed of the machine tool.

It is undesirable to have cutting speed surging in a machine tool control system and it is advisable to take precautions to reduce it or prevent it altogether. Apart from producing a poor finish on the workpiece, surging increases the likelihood of tool breakage.

In the present invention because of the arrangement of the detector severe attenuations of the e.m.f. due to pieces of swarf touching the workpiece and, the machine frame or the tool holder or both give rise to a readily detectable voltage excursion which may be used to initiate reduction in cutting speed and the operation of a warning device.

In order that the invention may be more easily understood an embodiment thereof will now be described with reference to the accompanying drawing which is a schematic circuit of a machine tool control system. The drawing shows diagrammatically a novel control system for a conventional lathe.

It comprises a potentiometer 1 which has its wiper arm connected to one input of a switch circuit 2 and to one connection of a voltmeter 3. One end of the potentiometer 1 is connected to earth, the other end is connected to a power supply (not shown). The other connection of the voltmeter 3 is connected to earth. The switch circuit 2 has a control input which is connected to an output of a threshold circuit 4. The output of the switch circuit 2 is connected to a summing input of an amplifier 5 via a resistor 6. Another summing input of the amplifier 5 is connected via a resistor 7 to a feedback line 8. The feedback line 8 is also connected to an input of the threshold circuit 4, to one connection of a voltmeter 9, and to the output of a differential amplifier 10 via a peak charge circuit 33. The summing junction of the amplifier 5 is connected to an overload indicator 11 and to one contact of a mode switch 12. The output of the amplifier 5 is connected to a summing input of a Ward-Leonard speed control system 13. Two other summing inputs to the Ward-Leonard control system 13 are connected respectively to a tachogenerator 14 and to the output of a switch circuit 15. A control input of the switch circuit 15 is connected to an output of the threshold circuit 4. The signal input of the switch circuit 15 is connected to the wiper arm of a potentiometer 16. The potentiometer 16 has one end earthed and its other end connected to a power supply (not shown). The lathe is conventionally constructed on a frame, which is represented by the chain-dotted line in the drawing and is electrically connected to earth. The lathe has a spindle 17 which is driven by the Ward-Leonard Speed Control system 13. A gold-plated slipring assembly 18 is mounted on the lathe spindle 17 adjacent to its workpiece holder or chuck 19. A platinum-iridium brush 20 makes electrical contact with the slipring 18 and is connected to the positive input of the amplifier 10. A workpiece 21 is shown mounted in the chuck 19. An insert-type toolholder 22 holds a cutting tool 23. A thermoelectric voltage $V_{TH}$ from the cutting tool 23 is connected to the negative input of the amplifier 10. A supply of coolant from a source (not shown) is fed through a pipe 24 and flows over the cutting tool 23. The toolholder 22 has an insulating ceramic coating (not shown) which electrically insulates it from the frame of the lathe.

The brush 20 is also connected via a resistance 25 to earth. The negative input of the amplifier 10 is also connected via a resistance 26 to earth and to the input of a threshold circuit 27. The threshold circuit 27 has a reference input connected to the slider arm of a potentiometer 28. The potentiometer 28 is connected between earth and the slider arm of the potentiometer 1 via a resistance 29. The output of the threshold circuit 27 is connected to the control input of a switching circuit 30. The switching circuit 30 has manually operable reset contacts 31. The circuit 30 has a switching output connected to a setting input of the threshold circuit 4, and another output connected to an indicator lamp 32.

The control system shown in the drawing is, in effect, a servosystem with two feedback loops. It has an inner feedback loop, with a fast response to changes in demanded speed, which is arranged to respond to voltage signals from either the potentiometer 16 of the amplifier 5 in conjunction with a voltage signal from the tachogenerator 14. This inner feedback loop controls the lathe spindle 17 at a set value of speed. An outer temperature-sensitive feedback loop is responsive to the thermoelectric e.m.f. $V_{TW}$ generated at the interface of the cutting tool 23 and workpiece 21 and is arranged to modify the action of the inner loop so as to adjust the set value of spindle speed which the inner loop tends to achieve. The outer loop comprises the amplifier 5, the Ward-Leonard speed control system 13, the thermal junction between the workpiece 21 and the cutting tool 23, the amplifier 10, the peak charge circuit 33 and the line 8.

The threshold circuit 4 is responsive to the level of the amplified thermoelectric voltage $V_{TW}$. It has two output states. In its first state, when $V_{TW}$ is below a predetermined level, it inhibits the voltage $V_{IN}$ by opening the switch 2, and enables the signal from the potentiometer 16 by closing the switch 15. In its second state, when the voltage $V_{TW}$ exceeds the predetermined level, it enables the voltage $V_{IN}$ and inhibits the signal from potentiometer 16. When the threshold circuit 4 is in its first state the amplifier 5 has no control on the speed of the lathe spindle 17. The threshold circuit 4 has also a setting input which when supplied with a signal from the switching circuit 30 sets the outputs in the first state regardless of the level of the voltage $V_{TW}$, which opens the switch 2 and closes the switch 15.

The mode switch 12 is provided so that it may be closed when desired, to inhibit any signal input to the amplifier 5 and thereby make the outer loop of the control system inoperative.

When the mode switch 12 is open the control system operates as follows:

Initially the cutting tool 23 is disengaged and the power to the system is switched on (by means not shown). The spindle speed is set to some relatively low value by means of the potentiometer 16. The potentiometer 1 is adjusted to provide a voltage $V_{IN}$ which corresponds to a chosen cutting edge temperature. This voltage may be conveniently read on the meter 3. When cutting commences, the cutting edge temperature rises, causing the development of a thermoelectric e.m.f. $V_{TW}$. The voltage $V_{TW}$ rapidly increases as the cutting edge temperature rises, and it switches the threshold circuit 4 into its second state. This opens the switch 15 and closes the switch 2, thereby causing the speed control system 13 to be governed by potentiometer 1 instead of potentiometer 16. The voltage $V_{TW}$ is arranged to have the opposite sign to the voltage $V_{IN}$. The amplifier 5 responds to the differences between the voltages $V_{IN}$ and $V_{TW}$ and its output now controls the Ward-Leonard speed control system 13. The servo action of the outer loop will adjust the speed of the lathe spindle 17 until $V_{TW}$ is substantially equal to $V_{IN}$. This condition indicates that the desired operating cutting edge temperature has been reached. The voltmeter 9 indicates the value of the voltage $V_{TW}$ and the conformity of its reading with the reading on the voltmeter 3 will indicate normal operation. Should the temperature of the cutting edge increase or decrease for any reason, the spindle speed, and therefore the metal cutting rate will be decreased or increased accordingly to restore the temperature to its desired value.

Thus the temperature of the cutting tool edge is adjusted to a value controlled by the voltage $V_{IN}$, which is preset so that the temperature reached is below the temperature at which accelerated tool wear takes place. The temperature is then maintained substantially constant throughout the machining process. If, due to any fault or unforeseen condition, a large signal builds up on the input junction of the amplifier 5, then the overload indicator 11 will come into operation and warn the operator to take remedial action.

On disengaging the cutting tool 23 the thermoelectric voltage $V'_{TW}$ will decrease rapidly. The threshold circuit 4 will be switched to its first state, inhibiting the voltage $V_{IN}$ and putting the spindle speed control system 13 back under the control of the potentiometer 16. The speed therefore will revert to the initial relatively low value mentioned heretobefore.

In this embodiment the e.m.f. $V_{TW}$ is divided into two main parts namely a first part $V_{SR}$ developed across the resistance 25 and a second part $V_{TH}$ developed across the resistance 26. These resistances have values of 10 ohms and 1 ohm respectively. The e.m.f. $V_{TW}$ is approximately equal to the sum of the e.m.f.'s $V_{SR}+V_{TH}$. Referring to the drawing, the thermoelectric current set up by the thermal e.m.f. flows from the thermoelectric junction 21 to 23 through the tool holder 22, the resistance 26, the common machine frame, through the resistance 25, the brush 20, the slipring 18, the spindle 17, the chuck 19 and into the workpiece 21, thus completing the circuit. The input resistance of the amplifier 10 is very high and may be neglected as regards the thermal current. Also the resistance of the spindle to the common machine frame via the machine bearings will be substantially higher than 10 ohms at operating speeds and may therefore be ignored even though it is in parallel with the resistance 25. Experiments indicate that the source impedance of the thermal junction is of the order of several milliohms while the combined resistances of all the junctions between the workpiece and slipring may be no greater than 0.5 ohms. The electrical resistance of the spindle bearings at operating speed may be several hundred ohms.

The e.m.f. $V_{SR}$ therefore will be approximately ten-elevenths of the e.m.f. $V_{TW}$ and the e.m.f. $V_{TH}$ will be approximately one-eleventh of $V_{TW}$. Both the e.m.f.'s $V_{SR}$ and $V_{TH}$ combine in the differential amplifier 10 to produce the amplified voltage $V'_{TW}$.

Because the tool holder 22 is insulated, any swarf which accumulates and bridges across the tool holder and machine frame, or any part of the machine tool which is in contact with the frame, will have little effect on the thermal e.m.f. $V_{TW}$. However, any swarf which simultaneously touches the workpiece 21 and machine frame will substantially short circuit the resistance 25 and thus cause a relatively high increase in the current flowing in the thermal e.m.f. circuit. This will produce a corresponding increase in the e.m.f. $V_{TH}$ developed across the resistance 26. Thus while the e.m.f. at the $V_{SR}$ input to the amplifier 10 practically disappears the e.m.f. at the $V_{TH}$ input increases. The sum of the e.m.f.'s $V_{SR}$ and $V_{TH}$ does not change and the amplified output $V_{TW}$ of the amplifier 10 is relatively unaffected. When swarf accumulation becomes severe however, pieces of swarf tend to bridge the workpiece and the hot part of the cutting tool near the edge, which reduces the total e.m.f. $V_{TW}$ applied to the amplifier 10. Normally this would cause a surge of speed.

Experiments have shown that swarf it unbroken by the chip breaker and allowed to accumulate, tends to bridge the workpiece and machine frame transiently before it becomes severe enough to undesirably affect the speed control circuits. In the present system an early indication of swarf accumulation is given by the relative increase in the e.m.f. $V_{TH}$.

The threshold circuit 27 compares the voltage $V_{TH}$ with a reference voltage derived from the demand value of $V_{TW}$ represented by the voltage $V_{IN}$. The reference voltage in the present embodiment is set equal to one-fifth of the voltage $V_{IN}$, but it need not be confined to that value. When the e.m.f. $V_{TH}$ exceeds the set reference voltage $V_{IN}/5$ the output of the threshold circuit 27 changes level and sets the switching circuit 30 into its operating state. In this state an indicator lamp 32 is lit to attract the attention of an operator, and a signal is supplied to the circuit 4 which causes that circuit to open the switch 2 and close the switch 15. These switching actions return the spindle speed control loop to the initial cutting condition governed by the predetermined setting of the potentiometer 16. As mentioned hereinbefore the signal supplied by the switching circuit 30 to the circuit 4 will under these circumstances override any signal on the $V'_{TW}$ line 8.

When this faulty operating condition is noticed by the operator he will remove the swarf and operate the contacts 31 to restore the switching circuit 30, and thereby the circuit 4, to normal operating conditions. Thus speed surging due to swarf will be avoided.

A machine tool control system employing thermal e.m.f. control would normally be expected to increase the cutting speed when the thermal e.m.f. is short circuited, because the feedback control loop would normally interpret the resulting drop in value of e.m.f. as a demand for increased speed. However with the detector system employed in the present embodiment, the result is a reduction of metal cutting speed to some relatively low steady value and a warning to an operator to take remedial action.

The provision of a supply of coolant to the cutting tool 23 does not significantly short circuit the thermoelectric voltage to the frame of the lathe, because the source impedance presented by the cutting tool - workpiece combination is extremely low, and the thermal e.m.f. signal is therefore not significantly affected by the conductance of the coolant which flows over it. The flow of coolant, apart from its normal function of facilitating the metal cutting action of the tool, has another beneficial effect in that it considerably reduces what are known as the "cold-junction" effects. These are the result of thermoelectric voltages developed across other intermetallic interfaces in the circuit between the cutting edge of the tool and the input to the amplifier 10. The main "cold-junction" effect is due to the interface between the tip and the shank of the tool in the common case of a carbide-tipped tool. The thermoelectric voltage across this interface opposes $V_{TW}$ and reduces the sensitivity of the system. It is therefore highly desirable to keep all such "cold-junction" interfaces cold, in order to minimize the voltage generated across them. A convenient and quite effective means for doing this is to make sure that the coolant flows over the "cold-junction" interface and cools it.

The problem of "cold-junction" voltages may be overcome without coolant. It is possible for example, to provide a temperature sensing device such as a copper-constantan junction or a resistance thermometer element embedded or attached in good thermal contact with the "cold-junction" area of the tool, and to use its output signal to compensate for the unwanted effect.

The peak charge circuit 33 consists of a diode series connected in the output line from the amplifier 10 and a capacitor connected between the line 8 and earth. The polarity of the diode connections is chosen to suit the polarity of the voltage, $V_{IN}$, and the polarity of the e.m.f. $V_{TW}$. For increasing values of the e.m.f. $V_{TW}$ the capacitor will charge up quickly through the forward conducting diode, while for decreasing values the capacitor will discharge relatively slowly because the diode will then be in a reverse biased condition. Thus an added time delay is introduced into the outer feedback loop for decreasing values of the e.m.f. $V_{TW}$ whereas for increasing values the response of the feedback loop is unchanged.

The effect of the peak charge circuit 33 on the control system is to allow a relatively rapid decrease of cutting speed when for example the cutting tool hits a hard area or if the demanded temperature represented by the voltage $V_{IN}$ is reduced. Hard areas occur in nonhomogenous materials such as cast iron and give rise to momentary increases in the thermal e.m.f. and a consequent tendency in the control system to reduce cutting speed.

The inclusion of the peak charge circuit 33 has another beneficial effect in that it also tends to compensate for some noise fluctuations in the thermal e.m.f. Such fluctuations tend to cause undesirable surging of the Ward-Leonard speed control system. However, the peak charge circuit 33 because of its slow response to decreasing values of the e.m.f. $V_{TW}$ will tend to smooth out the variations in the feedback voltage on the line 8 and thereby lead to a more uniform cutting speed.

What I claim is:

1. A control system for a metal cutting machine tool comprising a frame, a workpiece holder, and a cutting tool mounted on the frame and means for moving the cutting tool relative to the workpiece holder so as to cut a workpiece held therein, the said control system comprising:
    a first resistance electrically connected between the workpiece holder and the machine frame,
    a second resistance electrically connected between the cutting tool and the machine frame,
    thermal e.m.f. detection means having a first input electrically connected to the workpiece holder and a second input electrically connected to the cutting tool, for detecting and amplifying the thermal e.m.f. which will be developed between the cutting tool and the workpiece when the cutting tool is cutting the workpiece,
    speed control means connected to the thermal e.m.f. detection means and responsive thereto for adjusting the cutting speed of the tool so as to tend to bring the said thermal e.m.f. to a preset value,
    threshold means electrically connected to the said second resistance for producing a distinctive output signal whenever the portion of the thermal e.m.f. developed across the said second resistance exceeds a reference value,
    and switch means connected to the threshold means and the speed control means, for causing the speed control means to set the cutting speed at a predetermined speed whenever the said threshold means produces the said distinctive output signal.

2. A control system as claimed in claim 1 wherein the speed control means comprises servo means having an inner feedback loop responsive to a signal derived from an operating speed transducer and arranged to tend to maintain the cutting speed at a set value, and an outer feedback loop responsive to the said thermal e.m.f. and to a control signal and arranged to adjust the set value of cutting speed which the inner feedback loop tends to maintain so as to bring the said thermal e.m.f. to a preset value.

3. A control system as claimed in claim 2 and wherein the said thermal e.m.f. detecting circuit includes a differential input amplifier of which one input is connected to receive the voltage developed across the said first resistance and the other input is connected to receive the voltage developed across the said second resistant, the output of the said amplifier forming an amplified algebraic sum of the said voltages.

4. A control system as claimed in claim 3 and wherein the threshold means connected to the said second resistance is connected to receive a reference level which is a predetermined fraction of the said control signal.

5. A control system as claimed in claim 4, wherein there is included a threshold circuit connected to the said outer feedback loop and responsive to the said thermal e.m.f., and switching means connected to the said threshold circuit for substantially disconnecting the said outer feedback loop and setting the value of cutting speed maintained by the said inner feedback loop to a predetermined maximum value when the thermal e.m.f. is absent or less than a predetermined threshold voltage.

6. A control system as claimed in claim 5 including a peak charge circuit connected in the said outer feedback loop for producing an output voltage which represents an average of the peak values of variations of the said thermal e.m.f.

* * * * *